Feb. 10, 1959　　　KIYO TOMIYASU　　　2,873,430
ELECTRIC FIELD PROBE
Filed March 9, 1954　　　　　　　　　　　2 Sheets-Sheet 2

INVENTOR
KIYO TOMIYASU
BY
Thomas M. Ferrill, Jr.
ATTORNEY

United States Patent Office 2,873,430
Patented Feb. 10, 1959

2,873,430

ELECTRIC FIELD PROBE

Kiyo Tomiyasu, Flushing, N. Y., assignor to Sperry Rand Corporation, a corporation of Delaware Application March 9, 1954, Serial No. 414,979

12 Claims. (Cl. 333—35)

This invention relates to a proble for sampling energy in a wave guide, and more particularly, to a probe giving a relatively great output for a relatively low perturbation in the wave guide.

In exploring the electrical condition existing in a wave guide transmitting electromagnetic energy, it is customary to insert a probe through a slot in a wave guide wall to sample the energy. It is desirable to obtain a maximum output from the probe while causing a minimum perturbation, or change of conditions, in the wave guide. This minimum perturbation is necessary so that the metering system connected to the probe will show accurately the wave guide condition, rather than a condition as appreciably altered by the insertion of the probe.

It can be shown that a pure conductance probe (one, the equivalent circuit of which can be represented by an admittance which is a real quantity) gives a maximum output for a given wave guide perturbation. However, in tuning a probe to achieve pure conductance, it is impossible to recognize the condition without using a second contiguous impedance meter. Due to this inconvenience, pure conductance probes are generally not used in practice. The probe is usually tuned for maximum output and hence to the condition of maximum conductance.

It is an object of this invention to provide a probe having a relatively great output for a relatively low perturbation in the wave guide.

It is a further object of this invention to provide a probe having a high impedance at the probe tip but a low attenuation throughout the remainder of the probe.

It is also an object of this invention to provide a probe in which a tunable transformer is provided adjacent the probe tip.

These and other objects will become apparent to those skilled in the art from a consideration of the following specification taken in connection with the accompanying drawing in which.

Figure 1:
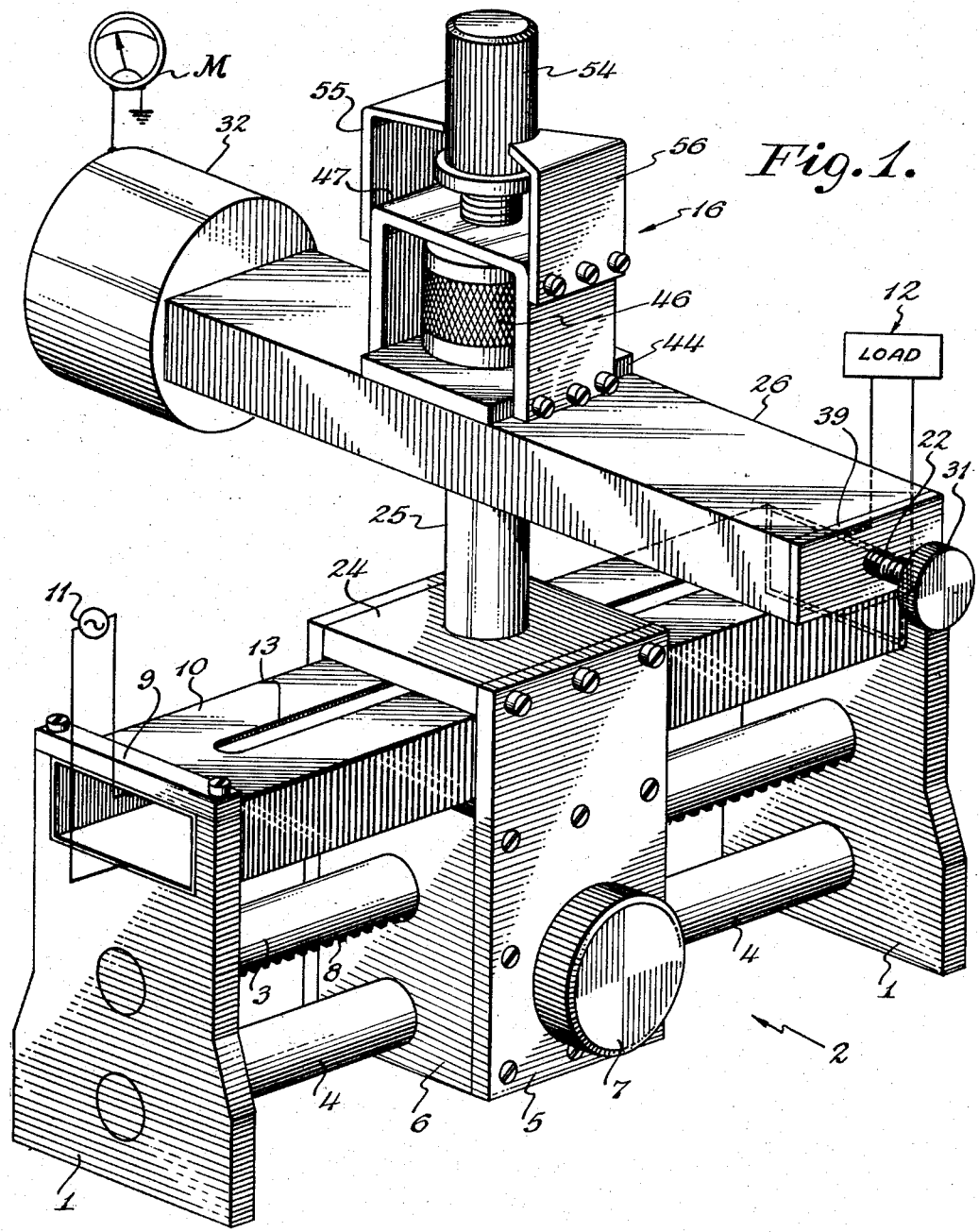
Fig. 1 is a perspective view, partly schematic, showing in conjunction with a wave guide and carriage, a standing wave detector embodying this invention.

As best seen in Fig. 1, a wave guide 10 transmits high frequency electromagnetic waves from the source 11 to the load 12, the source and load being connected to the wave guide 10 at opposite ends thereof. The impedance of the load 12 may be determined from a measurement of the standing wave existing in the wave guide 10.

Figure 2:
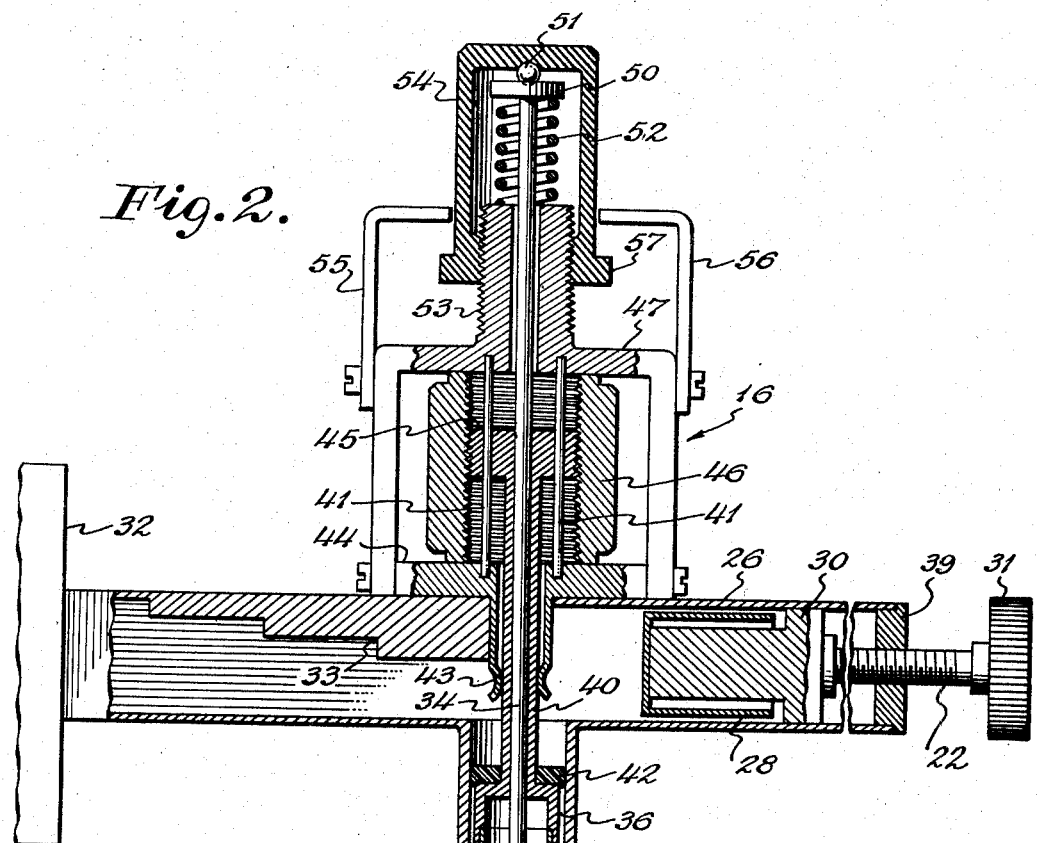
Fig. 2 is an elevation view in section of the standing wave detector shown in Fig. 1.

A probe, indicated generally at 16, is held in relation to wave guide 10 by a carriage, indicated generally at 2, so that the probe apron 18, best seen in Fig. 2, projects into the slot 13 of the wave guide 10, so that the probe wire 19 extends through the slot 13 and into the wave guide 10, and so that the probe 16 is not in contact with the wave guide 10. There is a small air gap between the probe base 24 and the top face of wave guide 10, and also between the apron 18 and the edges of the slot 13.

Carriage 2 is comprised of two end supports 1—1 which are clamped to either end of wave guide 10 as by clamping bars 9—9 and screws. Rods 3 and 4, round in cross-section, extend between and are fixed to the end supports 1—1. A series of teeth, forming a rack 8, are cut into the lower portion of the upper rod 3. Side plates 5—5 are fixed to the sides of base plate 24 of probe 16 as by screws. Two cross-plates 6—6, only one of which can be seen in Fig. 1, extend between the two side edges of side plates 5—5 and are fixed thereto as by screws. Cross-plates 6—6 each have two holes therein through which pass respectively the rods 3—4. The rods 3—4 make a tight, sliding fit with the holes in cross-plates 6—6, so that the base plate is rigidly and precisely held against any movement transversely of the longitudinal axis of the wave guide 10. Knob 7 is fixed to a shaft, journalled in side plates 5—5, to which is also fixed a pinion, not shown, meshing with the rack 8 on rod 3.

A bushing 20 of dielectric material, preferably teflon, lines the hole in the apron 18 through which the electrically conducting wire 19 extends, preventing electrical contact between the wire 19 and the apron 18. Apron 18 is an axially extending annular portion of the end closure 27 which closes the end of the tubular member 25. Tubular member 25 and end closure 27 are fastened to and are in electrical contact with the base 24 of the probe. Recessed in the bottom of the base 24 and concentric with the probe wire 19 and the apron 18 is a polyiron washer 23.

Tubular member 25 is peripherally connected to an aperture in the bottom broad wall of the output wave guide 26. Output wave guide 26 is terminated at one end by a movable shorting plunger 30 connected by threaded shaft 22 to the knob 31. Shaft 22 is in threaded engagement with the end closure 39 of the wave guide 26. The plunger 30 is arranged for sliding movement in wave guide 26. A half-wave choke 28 is provided at the inner end of plunger 30. The other end of output wave guide 26 feeds a detector 32 which may be a crystal and which is connected to output meter M. Probe wire 19 is fixed concentrically in the end of, and is supported by, shaft 34 which is axially aligned therewith.

A tuning slug 35, which is a hollow cylinder, is supported by a hollow shaft 40 which surrounds and extends coaxially with the shaft 34. A washer 42 of dielectric material such as polystyrene, fits about the hollow shaft 40 at the top of the tuning slug 35 and is fixed therewith as by cementing. The lower end of the hollow shaft 40 is connected to the upper part of the tuning slug 35. The lower portion of the tuning slug 35 is split and makes a rubbing electric contact with wire 19.

Figure 3:
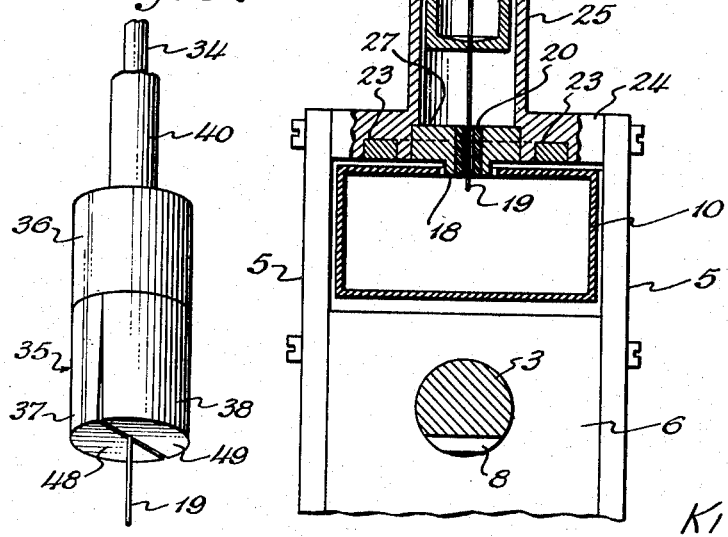
Fig. 3 is a perspective view of the probe wire and tuning slug shown in section in Fig. 2.

As shown in Figs. 2 and 3, the tuning slug 35 is comprised of three pieces, an upper cylindrical portion 36, and two lower substantially semi-cylindrical portions 37 and 38, the upper parts of which are outwardly rabbeted to be press-fitted within the inwardly rabbeted lower edge of the portion 36. The bottom ends of the semi-cylindrical portions 37 and 38 are respectively substantially closed by semi-circular end closures 48 and 49. These end closures have central matching recesses which clamp about the axially extending probe wire 19. Tuning slug 35 is made of a conducting material and preferably of one having resilient properties to exert a spring tension against the wire 19. The tuning slug 35 may be made of beryllium-copper. It will be understood that members 18, 27, 25 and 40 are constructed of a material having a relatively high electrical conductivity, such as brass.

Hollow shaft 40 extends through an aperture in the upper side of the wave guide 26. This aperture is lined with a bushing terminating, in wave guide 26, in spring fingers 43 which make a rubbing contact with the hollow shaft 40. The hollow shaft 40 also passes through an aperture in the plate member 44 fixed to the top of the output wave guide 26, and terminates at its upper end in an externally threaded annulus 45 which is in threaded engagement with an internally threaded tuning nut 46. The tuning nut 46 is considerably longer axially than the annulus 45. The axial motion of the nut 46 is confined between the plate 44 and the top of the yoke 47 which is fastened to the plate 44 as by screws. Two small diameter rods 41—41 are provided, one on either side of the hollow shaft 40, parallel therewith and adjacent thereto. Rods 41—41 are supported at their top ends by holes in the yoke 47 and at their bottom ends by holes in the plate 44. Rods 41—41 pass through corresponding holes in the annulus 45, these latter holes being of slightly larger diameter than the rods.

The shaft 34 extends all the way through the hollow shaft 40 and has at its upper end an annular shoulder 50. The upper end of shaft 34 has a recess in which is seated a ball bearing 51. A spring 52 is in compression between the shoulder 50 and the upper end of an externally threaded annulus 53, which is fixed to the top of the yoke 47 and is axially aligned with shaft 34.

A hollow knob 54 is internally threaded at its lower edge and is in threaded engagement with the annulus 53. A recess in the underside of the top of knob 54 forms the other seat for the ball bearing 51.

Retaining members 55 and 56, each having an inwardly turned top flange and each being connected at its bottom to either side of the yoke 47, are in alignment with the outwardly extending shoulder 57 at the bottom periphery of the knob 54.

In the operation of the probe herein disclosed, the base plate 24 is placed on top of the wave guide 10 with the apron 18 extending into the slot 13. The base 24 and the apron 18 are separated from the guide 10 by a small air gap maintained by the carriage 2. The axial extension of the apron 18 is arranged to be of such a length that its bottom edge is flush with the bottom edge of the slot 13. Probe 16 is moved as desired along the slot 13 by turning knob 7 of carriage 2.

The oscillator 11 sends radio frequency waves through the wave guide 10 to the load 12. Probe wire 19 is extended into the wave guide 10 by manipulation of the member 54. Probe wire 19 may be completely withdrawn from the interior of the wave guide 10 by turning knob 54 to its uppermost position against the retaining members 55 and 56. Probe wire 19 may be extended into the wave guide 10 to the fullest extent by screwing the knob 54 down tight against the spring 52. The ball bearing 51 provides a turning contact of little friction between the knob 54 and the shaft 34. The axial movement of the knob 54 is transmitted through the shaft 34 to the wire 19.

With the probe in a selected position along the slot 13, the tuning slug 35 is axially positioned by the tuning nut 46 for maximum pickup as delivered to the detector 32 and indicated by meter M. As the tuning nut 46 is turned in its restricted axial position, the threaded annulus 45 in engagement therewith is caused to be raised or lowered and to transmit this axial motion through the hollow shaft 40 to the tuning slug 35. The rods 41—41 prevent the shaft 40 from turning. As the tuning slug 35 is adjusted axially, its bottom closures 48 and 49 make good electrical contact with the wire 19. Spring fingers 43 make good electrical contact between hollow shaft 40 and the upper face of the output wave guide 26.

It will be seen that a coaxial line having an outer conductor 25 and an inner conductor consisting successively of the probe wire 19, the tuning slug 35 and the hollow shaft 40 transmits electrical energy from the wave guide 10 into the output wave guide 26. The stepped ridge 33 matches the impedance of the upper end of the coaxial line to that of the wave guide 26. Washer 42 serves to center the tuning slug 35 within the outer conductor 25. Polyiron washer 23 embedded in the base 24 of the probe 16 prevents energy from the wave guide 10 from escaping between the base 24 and the top of wave guide 10 to affect the reading of the meter. Polyiron washer 23 causes a low impedance to be presented between apron 18 and wave guide 10.

The approximate normalized maximum conductance of the probe can be represented as $$g\ \max = \frac{S'}{(X')^2} \qquad (1)$$

and $S_p$ the approximate perturbation VSWR caused in the wave guide 10 by the probe when the condition of maximum conductance exists is given by the equation $$S_p = 1 + \sqrt{g^2\ \max + \frac{1}{(X')^2}} \qquad (2)$$

where the symbols used in Equations 1 and 2 represents the following quantities:

$S' = S_d \dfrac{R_c}{R_g}$ $X' = X_1 + X_2$ $S_d$ = the VSWR between the probe wire 19 and the tubular member 25

$R_c$ = the characteristic impedance looking into the coaxial line comprised of wire 19 and tubular member 25

$R_g$ = the "characteristic impedance" of the wave guide 10

$X_1$ = the normalized capacitance between the probe wire 19 and the opposite broad face of the wave guide 10.

$X_2$ = the normalized capacitance between the probe wire 19 and the apron 18.

Probe coupling may be defined as the ratio of the probe power to the guide power. It can be shown mathematically that this ratio is numerically equal to $g$, the normalized probe conductance. The probe coupling may be expressed in decibels as $10\ \log_{10} g$.

For a given penetration of the probe wire 19 into the wave guide 10, the value of $X'$ is fixed. To get the maximum value of $g$, $S'$ must be as large as possible. The value of $$\frac{R_c}{R_g}$$

in a typical probe, ranges from ⅛–¼. If $S'$ is to be as large as possible and $$\frac{R_c}{R_g}$$

is limited to a small range of values, then $S_d$ must be quite large. It can be shown that the equations for a pure conductance probe substantially are satisfied by making $S_d$ large. As is known in the art, minimum perturbation for a given amount of coupling is produced in a wave guide when a pure conductance probe is utilized. Thus, the above mathematical analysis indicates, and experiment confirms, that a high VSWR is necessary between the probe wire 19 and the tubular member 25 to achieve the lowest possible perturbation VSWR in the guide 10 consistent with that value of coupling produced by the magnitude of $S_d$. However, if too high a value of VSWR between probe wire 19 and tubular member 25 is achieved, the probe coupling will be lowered to an intolerable degree and insufficient power will be passed by the probe to the crystal 32.

The following equation approximately expresses the relation of the pertinent impedances to the VSWR ($S_d$) between the probe wire 19 and the tubular member 25:

$$Z_{02} = \sqrt{\frac{Z_{01} \cdot Z_{03}}{S_d}} \qquad (3)$$

where $Z_{01}$ is the normalized characteristic impedance of the line composed of the outer conductor 25 and the hollow shaft 40, where $Z_{02}$ is the normalized characteristic impedance of the coaxial line composed of the outer conductor 25 and the tuning slug 35, and where $Z_{03}$ is the normalized characteristic impedance of the coaxial line composed of the probe wire 19 and the outer conductor 25.

In designing the probe, $S_d$ the probe tip VSWR, can be assumed from a consideration of resulting probe coupling ($g$ max) and wave guide perturbation $S_p$ as shown by Equations 1 and 2 or of graphs drawn therefrom. The impedance, and then the dimensions, of the coaxial lines 40—45, 35—25, and 19—25 can be found by substituting the assumed value for $S_d$ and one or more assumed values for the impedances $Z_{01}$, $Z_{02}$, and $Z_{03}$ in Equation 3. The tuning slug 35 is a quarter wave transformer and is approximately one-quarter wavelength (in the coaxial line) in its longitudinal dimension.

If the design first arrived at by this method is unsatisfactory, the design can be altered until the resulting values for probe coupling, wave guide perturbation and probe dimensions, as indicated by Equations 1, 2, and 3 are satisfactory.

It will be noted that this method of fixing the diameter of the tuning slug 35 does not fully take into consideration the impedance of the line composed of the probe wire 19 and the apron 18, treating this impedance as a lumped capacitance. However, it will be found that a full consideration of this factor and other contributing ones do not materially affect the resulting design.

A probe constructed in accordance with the teaching of this specification was operated successfully in frequencies between 7000 and 10000 megacycles. The probe wire 19 was music wire having a diameter of .013 inch. The inside diameter of the tubular member 25 was .266 inch. The outside diameter of the tuning slug 35 was .23 inch. The hollow shaft 40 had an outside diameter of .063 inch. The axial length of the bushing 20 was approximately $\frac{1}{10}$ wavelength in the line. The distance between the bottom of tuning slug 35 and the top of end closure 27 varied in use but was around $\frac{1}{8}$ wavelength in the line. This probe had a tip VSWR ($S_d$) of 200 and the characteristic impedances of the coaxial lines 40—25, 35—25, 19—25, and 19—18 were respectively 87, 9, 181, and 45 ohms.

In designing the probe, it must be considered that the characteristic impedance of the coaxial line formed by probe wire 19 and apron 18, should be made as large as possible to maximize $S_d$, the VSWR into the detecting element necessary to achieve a given probe conductance $g$. This can be accomplished by reducing the diameter of the probe wire and extending it further into the wave guide 10 or by increasing the diameter of the probe apron 18. The probe wire diameter cannot be reduced indefinitely due to physical limitations. The probe apron diameter cannot be increased indefinitely as the wide slot in the wave guide will cause undesired perturbation. A reasonable clearance must be provided between slug 35 and tubular member 25 to prevent dust from providing a conducting path between members 35 and 25.

It will be seen that the probe construction herein disclosed causes a minimum perturbation in the wave guide 10 by giving a high VSWR at the probe tip and yet by the use of a quarter wave transformer 35 reduces the VSWR and the resulting attenuation throughout the rest of the probe producing a probe giving optimum output for a minimum perturbation in the wave guide 10.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a probe, a length of coaxial line the tip of which is adapted to be inserted into a wave guide, output means connected to said coaxial line, and an adjustable quarter wave tuning slug connected between said tip and said output and arranged to provide a mismatch between said output and said probe tip to give a high VSWR at the probe tip.

2. In combination, in a probe, a length of coaxial line comprising inner and outer conductors, the inner conductor at one end of the coaxial line being adapted for insertion in a wave guide, output means at the other end of said coaxial line, a quarter wave tuning slug surrounding said inner conductor near said one end and electrically connected thereto, said slug being axially movable along said inner conductor, and means for moving said slug along said inner conductor to provide a high impedance at said one end of said coaxial line.

3. The combination of claim 2 in which there are provided means for adjusting the penetration of said inner conductor beyond the end of the outer conductor.

4. In a probe, the combination of a length of coaxial line comprising inner and outer conductors, one end of the outer conductor terminating in an apron of small diameter, one end of said inner conductor terminating in a small diameter wire passing through said apron, a tuning slug surrounding and concentric with said wire and supported within said outer conductor, said slug making electrical contact with said wire and being slideable therealong, the other end of said coaxial line being associated with output means and means for moving said slug along said wire.

5. Apparatus as defined in claim 4 wherein means are provided for axially moving said inner conductor relative said outer conductor.

6. The combination of claim 4 in which the tuning slug is a cylinder of conducting material surrounding and concentric with said wire and being fixed to a hollow shaft at its end near the output means, said slug being substantially closed at its end near the apron and being slit at said substantially closed end, the slit end gripping said wire to give a sliding electrical contact, and in which the hollow shaft is the inner conductor associated with said output means.

7. The combination of claim 4 in which the output means is a wave guide the longitudinal axis of which is perpendicular to the axis of the coaxial line.

8. The combination of claim 7 in which means are provided for matching said coaxial line to said output wave guide.

9. The combination of claim 7 in which detector means are associated with said output wave guide.

10. The combination of claim 8 in which their is further included a wave guide through which microwave radio frequency energy is transmitted, a slot running longitudinally along said wave guide, said apron being inserted in said slot.

11. In combination, an outer tubular conductor, one end of said outer conductor terminating in a centrally apertured apron of relatively small diameter, there being output means associated with the other end of said outer conductor, a small diameter wire passing through the aperture in said apron, said wire being fixed to and supported by a shaft coaxial with said wire and terminating at its other end in means for axially moving said shaft and wire, a conductive cylinder concentric with and surrounding said wire, the end of said cylinder near said apron being closed, split, and gripping said wire in a sliding contact, the other end of said cylinder being concentric with and fixed to one end of a hollow shaft concentric with and surrounding said shaft supporting said wire, the other end of said hollow shaft being associated with said output means and terminating in means for moving said hollow shaft and said cylinder axially.

12. In a probe, a length of coaxial line comprising inner and outer conductors, the inner conductor at one end of the coaxial line being adapted for insertion in a wave guide, output means at the other end of said coaxial line, and a quarter wave tuning slug surrounding said inner conductor near said one end and electrically connected thereto, there being a relatively large ratio between the outside diameter of said inner conductor and the inside diameter of said outer conductor at said one end to give a high characteristic impedance, there being a relatively low ratio between the outside diameter of said inner conductor and the inside diameter of said outer conductor at the other end of said coaxial line to provide a low characteristic impedance, said tuning slug being arranged to provide a resulting high VSWR at said one end.

References Cited in the file of this patent

UNITED STATES PATENTS

| | | |
|---|---|---|
| 2,427,752 | Strempel et al. | Sept. 23, 1947 |
| 2,432,097 | Hewitt | Dec. 9, 1947 |
| 2,526,399 | Okress | Oct. 17, 1950 |
| 2,627,550 | Rose | Feb. 3, 1953 |
| 2,653,299 | Ginzton | Sept. 22, 1953 |
| 2,704,348 | Carlin | Mar. 15, 1955 |
| 2,724,800 | Hansen | Nov. 22, 1955 |